US012792754B2

(12) United States Patent
Kulkarni et al.

(10) Patent No.: US 12,792,754 B2
(45) Date of Patent: Nov. 10, 2026

(54) EMBEDDED CONTROLLER TO TRUSTZONE SECURE COMMUNICATION

(71) Applicant: QUALCOMM Incorporated, San Diego, CA (US)

(72) Inventors: Balaji Bhaskar Kulkarni, Bangalore (IN); Aditya Srikanth Susarla, Poway, CA (US); Manish Rajendra Mehta, Bangalore (IN); Sumeet Kumar Sahu, Berhampur (IN); Ganesh Babu Ketti Gangadharan, Bangalore (IN); Saritha Sivapuram, San Diego, CA (US); Ashish Grover, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 19/181,214

(22) Filed: Apr. 16, 2025

(65) Prior Publication Data

US 2026/0330043 A1 Oct. 22, 2026

(51) Int. Cl.
*G06F 21/60* (2013.01)
*G06F 13/24* (2006.01)

(52) U.S. Cl.
CPC ............ *G06F 21/606* (2013.01); *G06F 13/24* (2013.01)

(58) Field of Classification Search
CPC ............................... G06F 21/606; G06F 13/24
See application file for complete search history.

(56) References Cited

U.S. PATENT DOCUMENTS

| | | | | |
|---|---|---|---|---|
| 6,414,675 B1 * | 7/2002 | Shen | G06F 1/1616 710/14 |
| 6,931,553 B1 * | 8/2005 | Plante | G06F 9/4812 710/262 |
| 9,098,715 B1 * | 8/2015 | Spear, Jr. | G06F 21/604 |
| 9,804,905 B1 * | 10/2017 | Dunham | G06F 9/544 |
| 10,574,689 B1 * | 2/2020 | Hoyos | H04L 63/145 |
| 10,754,967 B1 * | 8/2020 | Arora | G06F 21/74 |
| 10,972,449 B1 * | 4/2021 | Levin | G06F 21/445 |
| 11,048,512 B1 * | 6/2021 | Raj | G06F 9/5005 |
| 11,386,197 B1 * | 7/2022 | Mukherjee | G06F 21/606 |
| 11,397,661 B1 * | 7/2022 | Chiu | G06F 1/1632 |
| 11,531,760 B1 * | 12/2022 | Righi | G06F 21/85 |
| 11,726,855 B1 * | 8/2023 | Hung | G06F 11/0772 714/48 |
| 11,847,226 B1 * | 12/2023 | Righi | G06F 13/4063 |
| 11,924,908 B1 * | 3/2024 | Paczkowski | H04W 76/27 |
| 12,632,626 B1 * | 5/2026 | Deng | G06F 30/31 |
| 12,646,113 B2 * | 6/2026 | Bai | G06Q 20/123 |
| 2003/0097558 A1 * | 5/2003 | England | G06F 21/57 713/155 |
| 2003/0120960 A1 * | 6/2003 | Cooper | G06F 1/3203 713/320 |
| 2003/0126498 A1 * | 7/2003 | Bigbee | G06F 11/0724 714/24 |

(Continued)

*Primary Examiner* — Aravind K Moorthy
(74) *Attorney, Agent, or Firm* — LOZA & LOZA, LLP/QUALCOMM

(57) ABSTRACT

A computer system includes an application processor and an embedded controller. The application processor includes a TrustZone for implementing a trusted application. To perform a secure data exchange with the trusted application, the application processor first issues an interrupt to a non-secure application of an operating system of the application processor.

20 Claims, 3 Drawing Sheets

(56) References Cited

U.S. PATENT DOCUMENTS

| | | | | | |
|---|---|---|---|---|---|
| 2004/0030901 | A1* | 2/2004 | Wheeler | H04L 9/3247 | 713/176 |
| 2006/0168213 | A1* | 7/2006 | Richardson | G06F 21/606 | 709/225 |
| 2007/0006227 | A1* | 1/2007 | Kinney | G06F 9/45558 | 718/1 |
| 2007/0011471 | A1* | 1/2007 | Yu | G06F 1/3243 | 713/300 |
| 2007/0300218 | A1* | 12/2007 | Mann | G06F 9/4843 | 718/1 |
| 2008/0054830 | A1* | 3/2008 | Kausch | H02P 6/16 | 318/268 |
| 2008/0098146 | A1* | 4/2008 | Lee | G06F 13/24 | 710/269 |
| 2008/0307507 | A1* | 12/2008 | Conley | G06F 21/725 | 726/4 |
| 2009/0000831 | A1* | 1/2009 | Miller | G06F 3/03545 | 345/179 |
| 2009/0320128 | A1* | 12/2009 | Pant | G06F 21/554 | 726/22 |
| 2010/0030991 | A1* | 2/2010 | Liu | G06F 8/65 | 711/163 |
| 2010/0153765 | A1* | 6/2010 | Stemen | G06F 1/3203 | 713/340 |
| 2011/0035611 | A1* | 2/2011 | Brey | G06F 1/3203 | 713/320 |
| 2011/0131400 | A1* | 6/2011 | Chiu | G06F 1/206 | 713/2 |
| 2012/0030731 | A1* | 2/2012 | Bhargava | H04L 63/10 | 726/3 |
| 2012/0158890 | A1* | 6/2012 | Jreij | G06F 11/3058 | 713/1 |
| 2012/0166746 | A1* | 6/2012 | Amar | G06F 21/74 | 711/E12.098 |
| 2012/0174097 | A1* | 7/2012 | Levin | G06F 9/5077 | 718/1 |
| 2012/0192277 | A1* | 7/2012 | Jakobsson | H04L 63/145 | 726/22 |
| 2013/0085880 | A1* | 4/2013 | Roth | H04L 63/08 | 705/26.1 |
| 2013/0268997 | A1* | 10/2013 | Clancy, III | H04L 63/0227 | 726/1 |
| 2013/0318336 | A1* | 11/2013 | Yu | G06F 9/4401 | 713/2 |
| 2013/0335223 | A1* | 12/2013 | Brown | G08B 13/14 | 340/568.1 |
| 2014/0006800 | A1* | 1/2014 | Bickford | H04W 12/086 | 713/189 |
| 2014/0068273 | A1* | 3/2014 | Sobel | G06F 16/196 | 713/189 |
| 2014/0096213 | A1* | 4/2014 | Quan | G06F 21/606 | 726/7 |
| 2014/0101716 | A1* | 4/2014 | Touboul | H04L 63/0236 | 726/1 |
| 2014/0157436 | A1* | 6/2014 | Fujisaki | G06F 21/629 | 726/28 |
| 2014/0215247 | A1* | 7/2014 | Lin | G06F 1/3228 | 713/323 |
| 2015/0019855 | A1* | 1/2015 | Chen | G06F 9/4411 | 713/2 |
| 2015/0046712 | A1* | 2/2015 | Korkishko | H04L 9/3234 | 713/170 |
| 2015/0082092 | A1* | 3/2015 | Sarangi | G01R 31/31721 | 714/30 |
| 2015/0277778 | A1* | 10/2015 | Adams | G06F 3/0673 | 710/5 |
| 2015/0324593 | A1* | 11/2015 | Abuelsaad | H04L 63/168 | 726/26 |
| 2016/0150621 | A1* | 5/2016 | Zhang | H05B 47/11 | 315/149 |
| 2016/0283928 | A1* | 9/2016 | Sun | H04L 63/04 | |
| 2016/0328277 | A1* | 11/2016 | Ahmed | G06F 9/52 | |
| 2016/0371495 | A1* | 12/2016 | Bhat | G06F 21/445 | |
| 2017/0164201 | A1* | 6/2017 | Li | G06F 21/57 | |
| 2017/0214530 | A1* | 7/2017 | Seibel | G06F 21/53 | |
| 2017/0272544 | A1* | 9/2017 | Sheppard | A63F 13/77 | |
| 2017/0286705 | A1* | 10/2017 | Li | H04L 63/06 | |
| 2017/0300716 | A1* | 10/2017 | Reisgies | G06F 21/606 | |
| 2018/0173884 | A1* | 6/2018 | Hande | G06F 21/606 | |
| 2018/0232183 | A1* | 8/2018 | Rajendiran | G06F 1/266 | |
| 2018/0278611 | A1* | 9/2018 | Tan | H04L 9/3268 | |
| 2019/0097971 | A1* | 3/2019 | Coleman | H04L 63/0281 | |
| 2019/0187766 | A1* | 6/2019 | Hirosawa | G06F 1/28 | |
| 2019/0250928 | A1* | 8/2019 | Vidyadhara | G06F 8/65 | |
| 2019/0251047 | A1* | 8/2019 | Lin | G06F 13/24 | |
| 2019/0265776 | A1* | 8/2019 | Montero | G06F 1/3212 | |
| 2019/0294798 | A1* | 9/2019 | Jin | G06F 21/53 | |
| 2019/0311145 | A1* | 10/2019 | Baskaran | G06F 21/6209 | |
| 2019/0340063 | A1* | 11/2019 | Chao | G06F 11/0772 | |
| 2020/0151048 | A1* | 5/2020 | Shantamurthy | G06F 11/0751 | |
| 2020/0167488 | A1* | 5/2020 | Yitbarek | G06F 21/606 | |
| 2020/0202645 | A1* | 6/2020 | Gintz | G07C 5/0825 | |
| 2020/0228568 | A1* | 7/2020 | Bursell | H04L 63/1425 | |
| 2020/0257794 | A1* | 8/2020 | Kim | G06F 21/12 | |
| 2020/0320199 | A1* | 10/2020 | Sheth | H04L 63/123 | |
| 2021/0318972 | A1* | 10/2021 | Benhammadi | G06F 21/85 | |
| 2021/0326489 | A1* | 10/2021 | Kee | G06F 12/0638 | |
| 2021/0397698 | A1* | 12/2021 | Li | H04L 9/3263 | |
| 2022/0091879 | A1* | 3/2022 | Hashimoto | G06F 9/4418 | |
| 2022/0141192 | A1* | 5/2022 | Silveira | G06F 21/606 | 726/15 |
| 2022/0350500 | A1* | 11/2022 | Chen | G06F 11/1666 | |
| 2022/0382890 | A1* | 12/2022 | Boyapalle | G06F 21/606 | |
| 2023/0222200 | A1* | 7/2023 | Grobelny | G06F 21/34 | 726/1 |
| 2023/0297666 | A1* | 9/2023 | Atamli | G06F 21/53 | 726/23 |
| 2023/0305834 | A1* | 9/2023 | Kumar | G06F 8/65 | |
| 2023/0351028 | A1* | 11/2023 | Ponsini | G06F 21/606 | |
| 2024/0028547 | A1* | 1/2024 | Warkentin | G06F 13/4221 | |
| 2024/0152601 | A1* | 5/2024 | Zhao | G06F 21/57 | |
| 2024/0330033 | A1* | 10/2024 | Tsirkin | G06F 9/45558 | |
| 2024/0346857 | A1* | 10/2024 | Gintz | G05D 1/0022 | |
| 2024/0378102 | A1* | 11/2024 | Lenz | G06F 11/3027 | |
| 2024/0427399 | A1* | 12/2024 | Lin | G06F 1/28 | |
| 2025/0103526 | A1* | 3/2025 | Shelley | G06F 1/04 | |
| 2025/0124139 | A1* | 4/2025 | Andersen | G06F 21/606 | |
| 2025/0138963 | A1* | 5/2025 | Meenakshisundaram | G06F 11/0784 | |
| 2025/0173157 | A1* | 5/2025 | Zou | G06F 9/4411 | |
| 2025/0245358 | A1* | 7/2025 | Mandya Lakshman | G06F 21/606 | |
| 2025/0252185 | A1* | 8/2025 | Suryanarayana | G06F 21/572 | |
| 2025/0252194 | A1* | 8/2025 | Grobelny | G06F 21/6254 | |
| 2025/0258735 | A1* | 8/2025 | Jia | G06F 11/073 | |
| 2025/0335205 | A1* | 10/2025 | Sayyed | G06F 9/4406 | |
| 2026/0002988 | A1* | 1/2026 | Mitra | G01R 31/31717 | |
| 2026/0003970 | A1* | 1/2026 | K G | G06F 21/577 | |
| 2026/0099451 | A1* | 4/2026 | Kulkarni | G06F 13/26 | |
| 2026/0133921 | A1* | 5/2026 | Gelb | G06F 13/20 | |
| 2026/0140878 | A1* | 5/2026 | Chang | G06F 12/0802 | |
| 2026/0142956 | A1* | 5/2026 | Wietfeldt | H04L 9/0894 | |
| 2026/0147726 | A1* | 5/2026 | Chalamalasetti | G06F 13/4221 | |

* cited by examiner

EMBEDDED CONTROLLER TO TRUSTZONE SECURE COMMUNICATION

TECHNICAL FIELD

The present application relates generally to computer systems with an embedded controller integrated circuit and an application processor integrated circuit including a TrustZone, and more particularly to the support of secure communication between the embedded controller and a trusted application in the TrustZone as triggered by an interrupt from the embedded controller to a non-secure application in the application processor.

BACKGROUND

A compute chipset may include an application processor (AP) integrated circuit having one or more processors. The AP integrated circuit may also be denoted as a system-on-a-chip (SoC). The SoC supports an operating system for one or more client applications (e.g., input/output devices). To enhance security, the SoC is partitioned into secure and non-secure portions. The secure portion is also denoted as a TrustZone as it supports a secure execution environment for trusted applications.

SUMMARY

In accordance with an aspect of the disclosure, a method of operation for a compute chipset is provided that includes: receiving an interrupt at a non-secure application of an operating system for an application processor over a first die-to-die interface from an embedded controller; alerting the non-secure application through a second die-to-die interface in response to receiving the interrupt that the embedded controller intends to communicate with a trusted application in a TrustZone of the application processor; and receiving secure data at the trusted application over a third die-to-die interface in response to the non-secure application alerting the trusted application that the embedded controller intends to communicate with the trusted application In accordance with another aspect of the disclosure, an application processor for a computer system is provide that includes: a TrustZone for executing a trusted application; a non-secure portion of the application processor for executing an operating system; and a non-secure application of the operating system, wherein the non-secure application is configured to respond to an interrupt received at the non-secure application over a first die-to-die interface with a read of a command over a second die-to-die interface to cause the non-secure application to alert the trusted application that an embedded controller intends to communicate with the trusted application over a third die-to-die interface, and wherein the trusted application is configured to respond to the alert from the non-secure application with a read of secure data from the third die-to-die interface.

Finally, in accordance with yet another aspect of the disclosure, a computer system is provided that includes: an application processor including: a TrustZone configured to implement a trusted application; and a non-secure portion configured to implement an operating system, wherein the operating system includes software for implementing an Advanced Configuration and Power Interface (ACPI); the computer system further including: an embedded controller configured to transmit an interrupt to the Advanced Configuration and Power Interface (ACPI) to initiate a secure communication with the trusted application, wherein the Advanced Configuration and Power Interface (ACPI) is configured to respond to the interrupt with a receipt of a command from the embedded controller and is configured to respond to the receipt of the command with an alerting of the trusted application that the embedded controller intends to have the secure communication with the trusted application.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

Figure 1:
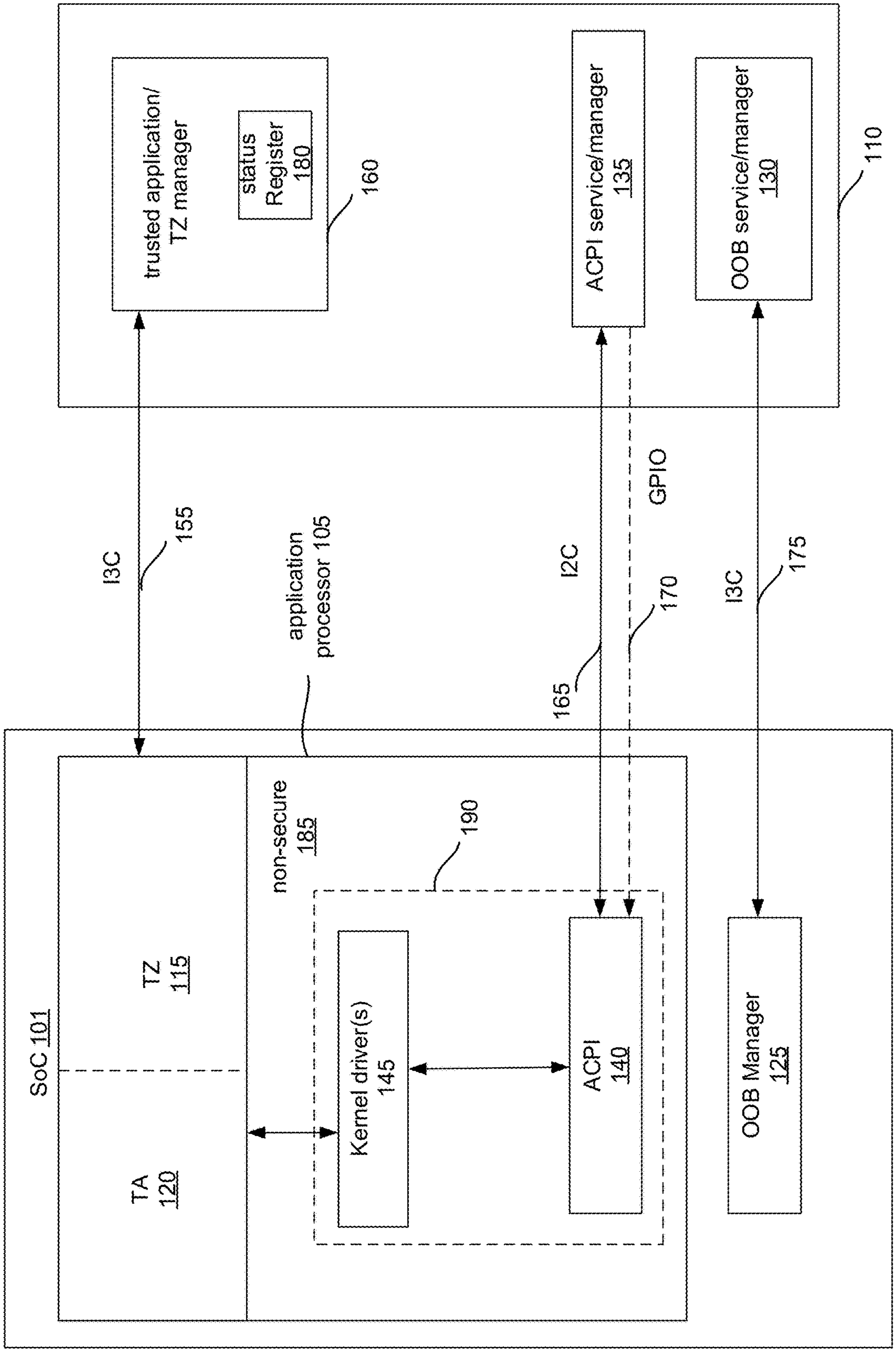
FIG. 1 illustrates a portion of a computer system in which a discrete sideband general-purpose input/output (GPIO) interrupt is leveraged to alert a trusted application that an embedded controller intends to securely communicate with the trusted application in accordance with an aspect of the disclosure.

A computer system (e.g., an ARM-based computer system) is provided that includes an application processor within a system-on-a-chip (SoC) integrated circuit. The application processor is partitioned into a secure hardware environment denoted as a TrustZone and into a non-secure environment that may also be denoted as the normal world. Within the normal world portion of the application processor is the hardware for an operating system (e.g., Linux). The operating system supports the execution of various non-secure applications such as web browsers, multi-media applications, video games, and social media. In contrast to the normal world portion of the application processor, the TrustZone provides a secure hardware foundation for the operation of trusted applications within a Trusted Execution Environment (TEE). Trusted applications are formed through software that runs in the TEE. Because of this execution of the software in the TEE, a hacker or malicious user is ideally prevented from hacking or changing the trusted application code. In this fashion, various sensitive functions such as management of cryptographic keys, secure transactions, digital rights management, and authentication of identity may be performed using the trusted applications.

The computer system also includes an embedded controller integrated circuit. Among other functions, the embedded controller controls power states of the application processor such as a sleep mode, an active mode, a light-sleep mode, and so on. The embedded processor also controls communication to trusted applications such as for passing credit card details, cryptographic keys, biometric data, or passwords. In this fashion, the non-secure environment of the operating system and its applications do not have access to sensitive data. To accommodate this communication, the embedded controller is coupled through a secure die-to-die interface to the TrustZone. In one implementation, the secure interface may be an Improved Inter-Integrated Circuit (I3C) interface, but it will be appreciated that other types of die-to-die (D2D) interfaces may be used in alternative implementations.

In response to a system crash or to stop the malfunctioning of the operating system, the TEE may remain in operation. In this fashion, a recovery agent (for example, an information technology (IT) agent) through a remote management controller (RMC) may proceed to debug the operating system malfunction and/or to recover operation of the operating system. In turn, the embedded controller may relay commands from the RMC to the application processor (and also receive data from the application processor) through a die-to-die interface with an out-of-band (OOB) manager in the SoC. As implied by the out-of-band designation, the OOB manager (which may also be designated an OOB subsystem) functions independently of the operating system. The RMC may thus proceed to debug the malfunction of the operating system and/or its applications through the OOB subsystem because the OOB subsystem will remain operational despite the malfunction of the operating system.

Although the OOB subsystem is useful to recover the operating system from crashes, there are also situations in which a user may desire to transmit opaque commands through the OOB subsystem to the embedded controller so that the embedded controller may in turn interact with a trusted application through the secure interface while the operating system operates normally. The commands are denoted as opaque commands because they are opaque to the OOB subsystem and instead understood by the embedded controller. The OOB subsystem thus functions as a pass-through device for the opaque commands. To alert a trusted application that the trusted application should either receive the opaque command from the embedded controller or engage in a data transaction over the secure interface in response to the embedded controller executing the opaque command would normally require the embedded controller to first transmit an interrupt to the TrustZone. But the TrustZone implementation does not support non-fatal interrupts. A fatal interrupt forces the operating system to already be non-operational or to stop operating. Since the interaction with the embedded controller in response to the opaque command occurs while the operating system is operational, the embedded controller should transmit a non-fatal interrupt (also denoted herein as an interrupt for brevity) to the TrustZone but this is not supported by the TrustZone. The computer system disclosed herein advantageously solves this problem as will be explained further herein so that the opaque commands may be transmitted from the OOB manager through the embedded controller for a resulting interaction between a trusted application and the embedded controller.

A similar problem occurs should the embedded controller need to inform a trusted application of a security issue such as a chassis intrusion detection or a basic input/output system (BIOS) configuration. For example, the embedded controller may inform a trusted application to protect or lock its memory partition (e.g., a partition of a Serial Peripheral Interface (SPI) NOR flash memory) in response to the chassis intrusion detection or to update its BIOS. If this embedded-controller-to-TrustZone communication needs to be performed while the operating system functions, the embedded controller cannot transmit an interrupt to the TrustZone to alert the trusted application of the pending communication. More generally, the computer system may need to support communication over the secure interface without the transmission of an interrupt (secure of otherwise) to the TrustZone. The computer system disclosed herein advantageously accommodates embedded-controller-to-TrustZone (or vice versa) communication despite the inability to transmit an interrupt over the secure interface to the TrustZone.

To support this communication, the computer systems disclosed herein first transmit an interrupt over a first die-to-die interface (e.g., a general-purpose input/output interface (GPIO)) to a non-secure application of the operating system for the application processor. In response to the interrupt, the non-secure application of the operating system communicates with the embedded controller over a second die-to-die interface so that the non-secure application is alerted that the embedded controller desires a data exchange with the trusted application during which the trusted application reads secure data from and/or writes secure data through the secure interface to the embedded controller. In the following discussion, it will be assumed that the non-secure application is an Advanced Configuration and Power Interface (ACPI) without loss of generality. The use of the ACPI is convenient because the embedded controller will typically have an ability to interrupt the ACPI over a sideband GPIO interface so that the embedded controller may control power states of the application processor such as a sleep mode, an active mode, a light-sleep mode, and so on. This existing sideband GPIO interface may be advantageously exploited herein so that no additional integrated circuit terminals need be added. However, alternative implementations of the computer system may use an additional terminal to support the interrupt of the non-secure application. The following discussion will thus be directed to the use of the existing sideband GPIO interface for the interrupt without loss of generality.

In response to the interrupt, the ACPI receives an instruction to notify the trusted application. This notification may occur through a software path such as formed by one or more kernel drivers. In response to the notification through the software path, the trusted application may then inform the TrustZone hardware that interacts with the secure interface to read the content of a command register within the embedded controller. Through this reading of the command register, the trusted application is instructed to perform either a read of secure data from the embedded controller or a write of secure data to the embedded controller through the secure interface. More generally, the trusted application will request the TrustZone to interact with the embedded controller through the secure interface to determine whether a read or write operation is to be performed over the secure interface. This reading or writing may occur in response to any of an opaque command, a chassis intrusion detection, or a BIOS configuration as discussed earlier or for any other use case in which the embedded controller needs to communicate with a trusted application without invoking a fatal interrupt.

An example computer system 100 is shown in FIG. 1. The terms "computer system" and "compute chipset" are used interchangeably herein. Thus, it will be appreciated that "chipset" in this context is directed generally to a computer system formed by a plurality of chips and not restricted to a system that manages the flow of data between a central processing unit (CPU) and its peripherals as is traditionally meant by the use of "chipset." For illustration clarity, only an SoC die (or integrated circuit) 101 and an embedded controller die (or integrated circuit) 110 are shown in FIG.

1. For brevity, the embedded controller die 110 will be denoted simply as the embedded controller 110. The SoC die 101 includes an application processor 105 The application processor 105 includes a TrustZone (TZ) 115 which provides the hardware for the execution of a trusted application (TA) 120. A non-secure (normal world) hardware portion 185 of the application processor 105 supports the execution of an operating system 190 and its user application software. In addition, the SoC 101 includes hardware for implementing an out-of-band (OOB) manager 125 (which may also be denoted as an OOB subsystem 125). The embedded controller 110 includes a OOB service/manager module 130 that receives opaque commands from the OOB manager over a die-to-die interface 175. In some implementations, the die-to-die interface 175 is an Improved Inter-Integrated Circuit (I3C) interface but it will be appreciated that other types of die-to-die interface protocols may be used to implement the die-to-die interface 175 in alternative implementations.

A remote management controller (not illustrated) may control the OOB manager 125 to transmit an opaque command over a die-to-die interface 175 to the module 130 to trigger a secure data exchange between the trusted application 120 and a trusted application/TZ manager module 160 in the embedded controller through a third die-to-die interface 155. The module 160 also manages a BIOS configuration for the trusteed application 120. As an alternative to the transmission of an embedded command, the software module 160 may thus need to transmit to or receive secure data from the trusted application 120 through the die-to-die interface 155 for a BIOS configuration. Alternatively, the software module 160 may need to alert the trusted application 120 through the die-to-die interface 155 to perform a security operation such as locking down its SPI NOR partition (not illustrated) in response to an event such as a chassis intrusion detection. In some implementations, the die-to-die interface 155 is an I3C interface but it will be appreciated that other types of die-to-die interfaces may be used in alternative implementations. Thus, although the following discussion is directed to the handling of an opaque command, it will be appreciated that numerous other use cases may be accommodated by the computer system 100 to trigger a secure communication over the die-to-die interface 155 without invoking a fatal interrupt. As discussed earlier, the embedded controller 110 cannot transmit an interrupt over the die-to-die interface 155 to the trusted application 120 because the TrustZone 115 does not support the use of non-fatal interrupts. The embedded controller 110 thus responds to the opaque command by interrupting a non-secure application through a first die-to-die interface. The sideband GPIO interface 170 is an example of a first die-to-die interface as defined herein. In some implementations, the interrupt is a one-bit signal.

Compute chipset 100 advantageously exploits this existing interrupt received by the ACPI 140 over the GPIO interface 170 as part of alerting the trusted application 120 that it should communicate with the embedded controller 110 using a secure data transmission or reception over the die-to-die interface 155. In response to the interrupt received over the GPIO interface 170, the ACPI 140 is configured to receive a command from an ACPI service/manager module 135 over a die-to-die interface 165. The die-to-die interface 165 is also denoted herein as a second die-to-die interface. In some implementations, the die-to-die interface 165 is an Inter-Integrated Circuit (I2C) interface but it will be appreciated that other types of die-to-die interface protocols may be used to implement the die-to-die interface 165 in alternative implementations. In response to receiving the command, the ACPI notifies the trusted application 120 through a software path of the operating system 190 formed by one or more kernel drivers 145. In response to the notification, the trusted application 120 initiates a read of a status or command register 180 through the TrustZone 115 and die-to-die interface 155. Depending upon the content of the command register 180, the trusted application 120 is commanded to either read secure data from the embedded controller 110 through the die-to-die interface 155 and the TrustZone 115 or to write secure data to the embedded controller 110 through the die-to-die interface 155 and the TrustZone 115.

Figure 2:
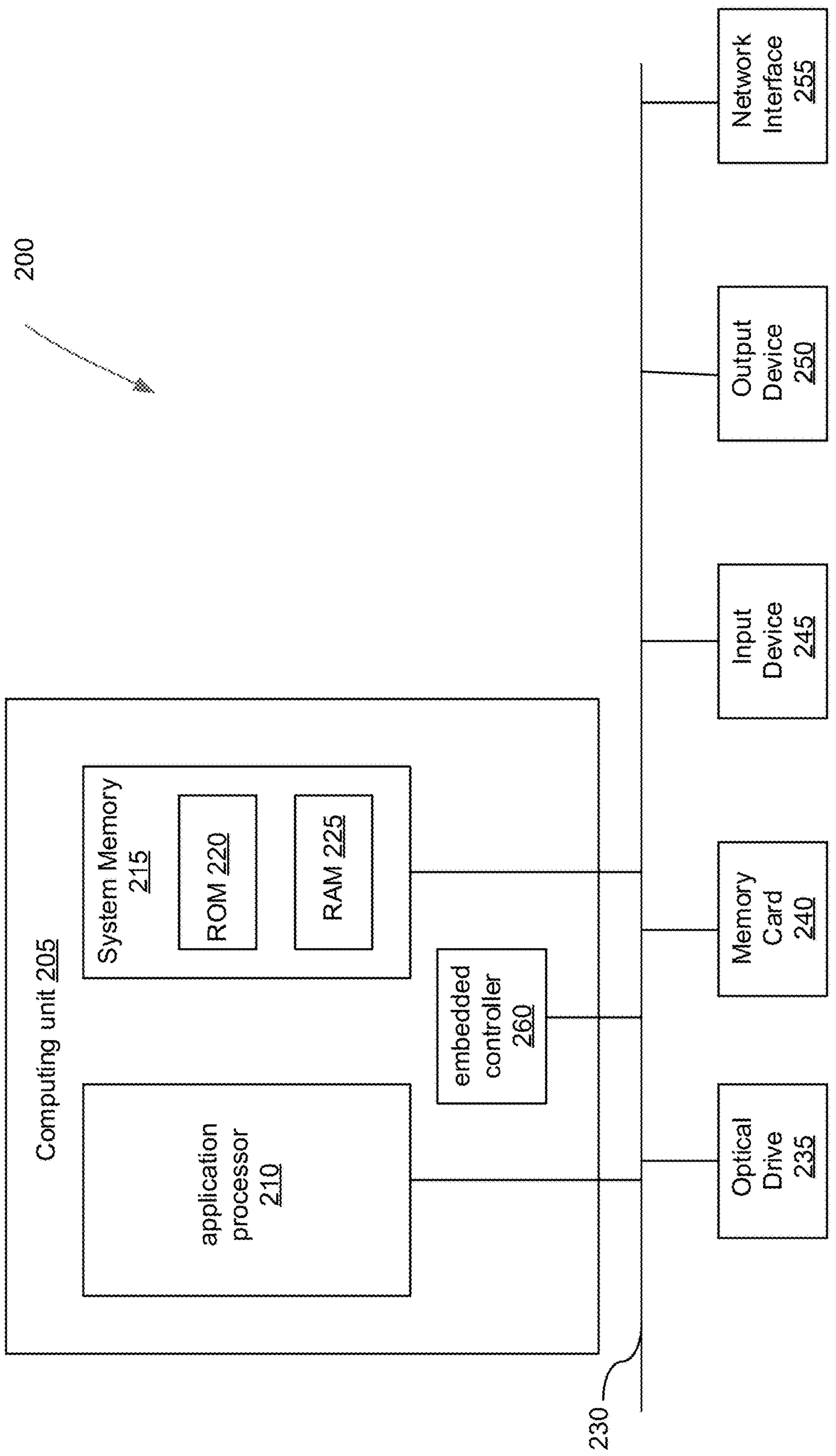
FIG. 2 illustrates an example computer system in which a discrete sideband GPIO interrupt is leveraged to alert a trusted application that an embedded controller intends to securely communicate with the trusted application in accordance with an aspect of the disclosure.

Any suitable computing system may be used to leverage a discrete sideband interrupt to a non-secure application to trigger secure data communication between the embedded controller and a trusted application in the TrustZone as disclosed herein. An example computing system 200 that leverages such an interrupt is shown in FIG. 2. As seen in this figure, the computing system 200 includes a computing unit 205 with an application processor 210 that executes instructions from and stores data in a system memory 215. An embedded controller 260 interrupts the application processor 210 as discussed analogously with respect to the computer system 100. The system memory 215 may include both a read-only memory (ROM) 220 and a random-access memory (RAM) 225. As will be appreciated by those of ordinary skill in the art, both the read-only memory (ROM) 220 and the random-access memory (RAM) 225 may store software instructions for execution by the application processor 210.

The application processor 210, the system memory 215, and the embedded controller 260 are connected, either directly or indirectly, through a bus 230 or alternate communication structure, to one or more peripheral devices. For example, the application processor 210 or the system memory 215 may be directly or indirectly connected to one or more additional memory storage devices, such as an optical disk drive 235, or a flash memory card 240. The application processor 210 and the system memory 215 also may be directly or indirectly connected to one or more input devices 245 and one or more output devices 250. The input devices 245 may include, for example, a keyboard, a pointing device (such as a mouse, touchpad, stylus, trackball, or joystick), a scanner, a camera, and a microphone. The output devices 250 may include, for example, a monitor display, a printer and speakers. With various examples of the computer system 200, one or more of the peripheral devices 235, 240, 245, and 250 may be internally housed within a housing of the computer system 200. Alternately, one or more of the peripheral devices 235, 240, 245, and 250 may be external to the housing and connected to the bus 230 through, for example, a Universal Serial Bus (USB) connection.

With some implementations, the computing system 200 may be directly or indirectly connected to one or more network interfaces 255 for communicating with other devices making up a network. The network interface 255 translates data and control signals from the computer system 200 into network messages according to one or more communication protocols, such as the transmission control protocol (TCP) and the Internet protocol (IP). Also, the interface 255 may employ any suitable connection agent (or combination of agents) for connecting to a network, including, for example, a wireless transceiver, a modem, or an Ethernet connection. Such network interfaces and protocols are well known in the art, and thus will not be discussed here in more detail. It should be appreciated that the computing system 200 is illustrated as an example only, and it not intended to be limiting. Various implementations may be formed using one or more computing systems that include the components of the system 2 illustrated in FIG. 2 or which include only a subset of the components illustrated in FIG. 2, or which include an alternate combination of components, including components that are not shown in FIG. 2.

Figure 3:
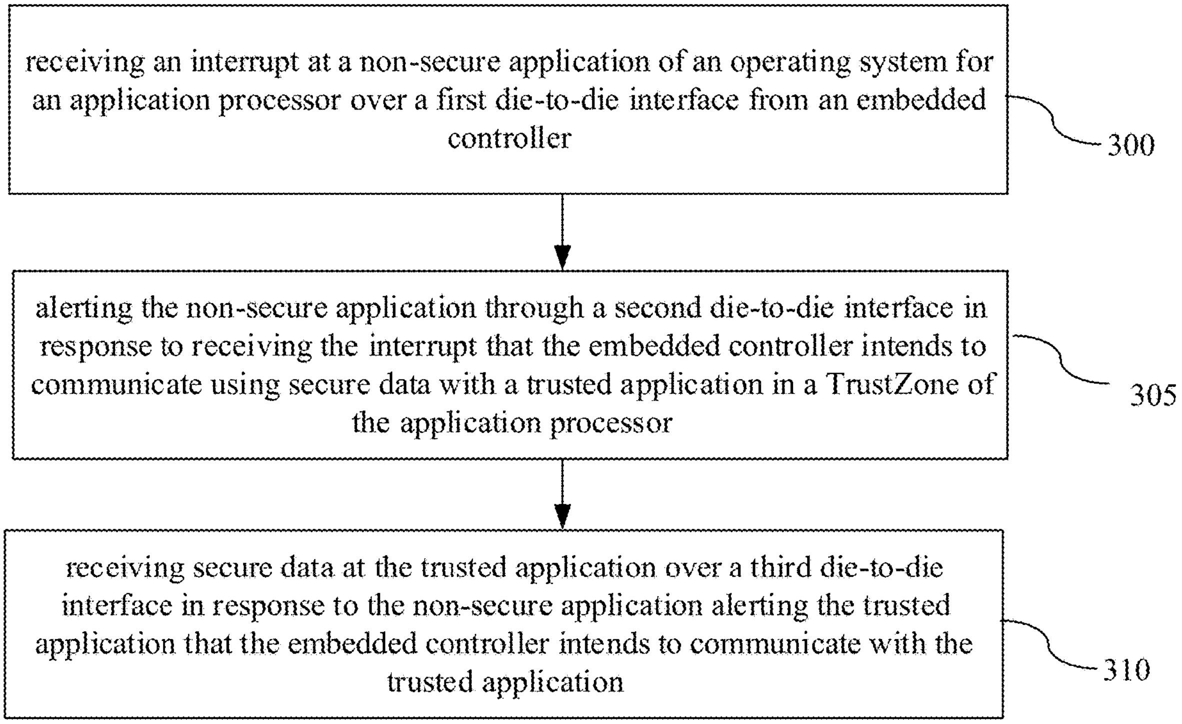
FIG. 3 is a flowchart for a method of leveraging an a discrete sideband GPIO interrupt to alert a trusted application that an embedded controller intends to securely communicate with the trusted application in accordance with an aspect of the disclosure.

A method of operation for a compute chipset that leverages an interrupt to initiate secure communication between an embedded controller and a trusted application will now be discussed with respect to the flowchart of FIG. 3. The method includes an act 300 of receiving an interrupt over a first die-to-die interface from an embedded controller to a non-secure application of an operating system for an application processor. The interrupt received at the ACPI 140 over the GPIO interface 170 is an example of act 300. The method further includes an act 305 of alerting the non-secure application through a second die-to-die interface in response to receiving the interrupt that the embedded controller intends to communicate with a trusted application in a TrustZone of the application processor. The alerting of the ACPI 140 over the I2C interface 165 is an example of act 305. Finally, the method includes an act 310 of receiving secure data at the trusted application over a third die-to-die interface in response to the non-secure application alerting the trusted application that the embedded controller intends to communicate with the trusted application. The receipt of secure data at the trusted application 120 in response to the ACPI 140 alerting the trusted application 120 through a software path is an example of act 310.

Some example aspects of the disclosure will now be summarized through the following numbered clauses:

Clause 1. A method of operation for a compute chipset, comprising:

receiving an interrupt at a non-secure application of an operating system for an application processor over a first die-to-die interface from an embedded controller;

alerting the non-secure application through a second die-to-die interface in response to receiving the interrupt that the embedded controller intends to communicate with a trusted application in a TrustZone of the application processor; and receiving secure data at the trusted application over a third die-to-die interface in response to the non-secure application alerting the trusted application that the embedded controller intends to communicate with the trusted application.

Clause 2. The method of clause 1, wherein receiving the interrupt at the non-secure application of the operating system for the application processor over the first die-to-die interface comprises receiving an interrupt at an Advanced Configuration and Power Interface (ACPI) of the operating system over the first die-to-die interface.

Clause 3. The method of clause 2, wherein receiving the interrupt at the Advanced Configuration and Power Interface (ACPI) over the first die-to-die interface comprises receiving the interrupt at the Advanced Configuration and Power Interface (ACPI) over a general-purpose input/output (GPIO) interface.

Clause 4. The method of any of clauses 2-3, wherein alerting the Advanced Configuration and Power Interface (ACPI) through a second die-to-die interface comprises alerting the Advanced Configuration and Power Interface (ACPI) through an Inter-Integrated Circuit (I2C) interface.

Clause 5. The method of any of clauses 2-4, wherein the non-secure application alerting the trusted application that the embedded controller intends to communicate with the trusted application comprises alerting the trusted application through a software path from the Advanced Configuration and Power Interface (ACPI).

Clause 6. The method of clause 5, wherein alerting the trusted application through the software path comprises alerting the trusted application through at least one kernel driver.

Clause 7. The method of any of clauses 2-6, wherein receiving the secure data at the trusted application over the third die-to-die interface comprises performing a read operation through a first Improved Inter-Integrated circuit (I3C) interface to receive the secure data.

Clause 8. The method of clause 7, further comprising:

reading a content of a command register through the first Improved Inter-Integrated circuit (I3C) interface to command the trusted application to perform the read operation.

Clause 9. The method of clause 8, further comprising:

performing a write operation from the trusted application through the first Improved Inter-Integrated circuit (I3C) interface to the embedded controller in response to reading the content of the command register.

Clause 10. The method of any of clauses 2-9, further comprising:

transferring an opaque command from an out-of-band manager over a second I3C interface to the embedded controller to trigger the embedded controller to transmit the interrupt to the Advanced Configuration and Power Interface (ACPI).

Clause 11. The method of clause 7, wherein performing the read operation causes the trusted application to configure a BIOS for the trusted application.

Clause 12. The method of clause 7, wherein performing the read operation causes the trusted application to secure a memory partition for the trusted application.

Clause 13. An application processor for a computer system, comprising:

a TrustZone for executing a trusted application;

a non-secure portion of the application processor for executing an operating system; and a non-secure application of the operating system, wherein the non-secure application is configured to respond to an interrupt received at the non-secure application over a first die-to-die interface with a read of a command over a second die-to-die interface to cause the non-secure application to alert the trusted application that an embedded controller intends to communicate with the trusted application over a third die-to-die interface, and wherein the trusted application is configured to respond to the alert from the non-secure application with a read of secure data from the third die-to-die interface.

Clause 14. The application processor of clause 13, wherein the first die-to-die interface comprises a GPIO interface.

Clause 15. The application processor of any of clauses 13-14, wherein the second die-to-die interface comprises a first I3C interface.

Clause 16. The application processor of any of clauses 13-15, wherein the third die-to-die interface comprises a second I3C interface.

Clause 17. The application processor of any of clauses 13-16, wherein the non-secure application comprises an Advanced Configuration and Power Interface (ACPI) of the operating system.

Clause 18. A computer system, comprising:

an application processor including:

a TrustZone configured to implement a trusted application; and a non-secure portion configured to implement an operating system, wherein the operating system includes software for implementing an Advanced Configuration and Power Interface (ACPI); the computer system further comprising:

an embedded controller configured to transmit an interrupt to the Advanced Configuration and Power Interface (ACPI) to initiate a secure communication with the trusted application, wherein the Advanced Configuration and Power Interface (ACPI) is configured to respond to the interrupt with a receipt of a command from the embedded controller and is configured to respond to the receipt of the command with an alerting of the trusted application that the embedded controller intends to have the secure communication with the trusted application.

Clause 19. The computer system of clause 18, wherein the operating system further includes software for implementing at least one kernel driver and wherein the Advanced Configuration and Power Interface (ACPI) is further configured to respond to the command with the alert of the trusted application as transmitted through at least one kernel driver.

Clause 20. The computer system of any of clauses 18-19, wherein the application processor is included within a system-on-chip that includes an out-of-band manager configured to transmit an opaque command to the embedded controller, and wherein the embedded controller is further configured to respond to the opaque command with a transmission of the interrupt.

As those of some skill in this art will by now appreciate and depending on the particular application at hand, many modifications, substitutions and variations can be made in and to the materials, apparatus, configurations and methods of use of the devices of the present disclosure without departing from the scope thereof as defined by the appended claims. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. A method of operation for a compute chipset, comprising:

receiving an interrupt at a non-secure application of an operating system for an application processor over a first die-to-die interface from an embedded controller;

alerting the non-secure application through a second die-to-die interface in response to receiving the interrupt that the embedded controller intends to communicate with a trusted application in a TrustZone of the application processor; and receiving secure data at the trusted application over a third die-to-die interface in response to the non-secure application alerting the trusted application that the embedded controller intends to communicate with the trusted application.

2. The method of claim 1, wherein receiving the interrupt at the non-secure application of the operating system for the application processor over the first die-to-die interface comprises receiving the interrupt at an Advanced Configuration and Power Interface (ACPI) of the operating system over the first die-to-die interface.

3. The method of claim 2, wherein receiving the interrupt at the Advanced Configuration and Power Interface (ACPI) over the first die-to-die interface comprises receiving the interrupt at the Advanced Configuration and Power Interface (ACPI) over a general-purpose input/output (GPIO) interface.

4. The method of claim 2, wherein alerting the Advanced Configuration and Power Interface (ACPI) through a second die-to-die interface comprises alerting the Advanced Configuration and Power Interface (ACPI) through an Inter-Integrated Circuit (I2C) interface.

5. The method of claim 2, wherein the non-secure application alerting the trusted application that the embedded controller intends to communicate with the trusted application comprises alerting the trusted application through a software path from the Advanced Configuration and Power Interface (ACPI) to the trusted application.

6. The method of claim 5, wherein alerting the trusted application through the software path comprises alerting the trusted application through at least one kernel driver.

7. The method of claim 2, wherein receiving the secure data at the trusted application over the third die-to-die interface comprises performing a read operation through a first Improved Inter-Integrated circuit (I3C) interface to receive the secure data.

8. The method of claim 7, further comprising:

reading a content of a command register through the first Improved Inter-Integrated circuit (I3C) interface to command the trusted application to perform the read operation.

9. The method of claim 8, further comprising:

performing a write operation from the trusted application through the first Improved Inter-Integrated circuit (I3C) interface to the embedded controller in response to reading the content of the command register.

10. The method of claim 7, wherein performing the read operation causes the trusted application to configure a BIOS for the trusted application.

11. The method of claim 7, wherein performing the read operation causes the trusted application to secure a memory partition for the trusted application.

12. The method of claim 2, further comprising:

transferring an opaque command from an out-of-band manager over a second I3C interface to the embedded controller to trigger the embedded controller to transmit the interrupt to the Advanced Configuration and Power Interface (ACPI).

13. An application processor for a computer system, comprising:

a TrustZone for executing a trusted application;

a non-secure portion of the application processor for executing an operating system; and a non-secure application of the operating system, wherein the non-secure application is configured to respond to an interrupt received at the non-secure application over a first die-to-die interface with a read of a command over a second die-to-die interface to cause the non-secure application to alert the trusted application that an embedded controller intends to communicate with the trusted application over a third die-to-die interface, and wherein the trusted application is configured to respond to the alert from the non-secure application with a read of secure data from the third die-to-die interface.

14. The application processor of claim 13, wherein the first die-to-die interface comprises a GPIO interface.

15. The application processor of claim 13, wherein the second die-to-die interface comprises an I3C interface.

16. The application processor of claim 13, wherein the third die-to-die interface comprises an I2C interface.

17. The application processor of claim 13, wherein the non-secure application comprises an Advanced Configuration and Power Interface (ACPI) of the operating system.

18. A computer system, comprising:

an application processor including:

a TrustZone configured to implement a trusted application; and a non-secure portion configured to implement an operating system, wherein the operating system includes software for implementing an Advanced Configuration and Power Interface (ACPI); the computer system further comprising:

an embedded controller configured to transmit an interrupt to the Advanced Configuration and Power Interface (ACPI) to initiate a secure communication with the trusted application, wherein the Advanced Configuration and Power Interface (ACPI) is configured to respond to the interrupt with a receipt of a command from the embedded controller and is configured to respond to the receipt of the command with an alert of the trusted application that the embedded controller intends to have the secure communication with the trusted application.

19. The computer system of claim 18, wherein the operating system further includes software for implementing at least one kernel driver and wherein the Advanced Configuration and Power Interface (ACPI) is further configured to respond to the command with the alert of the trusted application as transmitted through at least one kernel driver.

20. The computer system of claim 18, wherein the application processor is included within a system-on-chip that includes an out-of-band manager configured to transmit an opaque command to the embedded controller, and wherein the embedded controller is further configured to respond to the opaque command with a transmission of the interrupt.

* * * * *